United States Patent [19]

Caldicott

[11] 4,401,175

[45] Aug. 30, 1983

[54] SYSTEM FOR WEIGHING RAILROAD CARS IN MOTION DURING LOADING

[75] Inventor: Jack R. Caldicott, Barrington, Ill.

[73] Assignee: Mangood Corporation, Chicago, Ill.

[21] Appl. No.: 283,773

[22] Filed: Jul. 16, 1981

Related U.S. Application Data

[63] Continuation of Ser. No. 40,572, May 21, 1979, abandoned.

[51] Int. Cl.$^3$ ........................ G01G 19/04; G01G 19/02
[52] U.S. Cl. .................................... 177/163; 177/134; 177/DIG. 8
[58] Field of Search ......... 177/163, DIG. 8, 133–135, 177/1, 25, 116

[56] References Cited

U.S. PATENT DOCUMENTS

| | | | |
|---|---|---|---|
| 3,374,844 | 3/1968 | Rogers | 177/134 |
| 3,512,004 | 5/1970 | Papin | 177/163 X |
| 4,094,367 | 6/1978 | Jones | 177/163 X |

Primary Examiner—George H. Miller, Jr.
Attorney, Agent, or Firm—George H. Gerstman

[57] ABSTRACT

A system is provided for weighing freight cars coupled in motion during loading. An upstream weigh bridge is provided and is mechanically separated from a downstream weigh bridge, with a loading chute overlying one of the weigh bridges for dispensing material to the freight cars. The upstream weigh bridge has a length that is less than the distance between the rear axle of one car to be loaded and the front axle of the succeeding car.

The position of the freight car under consideration is sensed and the chute is opened to load the freight car. The full draft weight of the freight car during loading is detected, taking the weight on the upstream weigh bridge into consideration. The chute is closed when the weight reaches a predetermined amount. The weight of the loaded freight car is determined after the freight car has left the upstream weigh bridge and only the weight on the downstream weigh bridge is taken into consideration. The downstream weigh bridge may comprise a plurality of mechanically separated weigh bridge sections, operable for full draft weighing of different size freight cars during loading.

17 Claims, 6 Drawing Figures

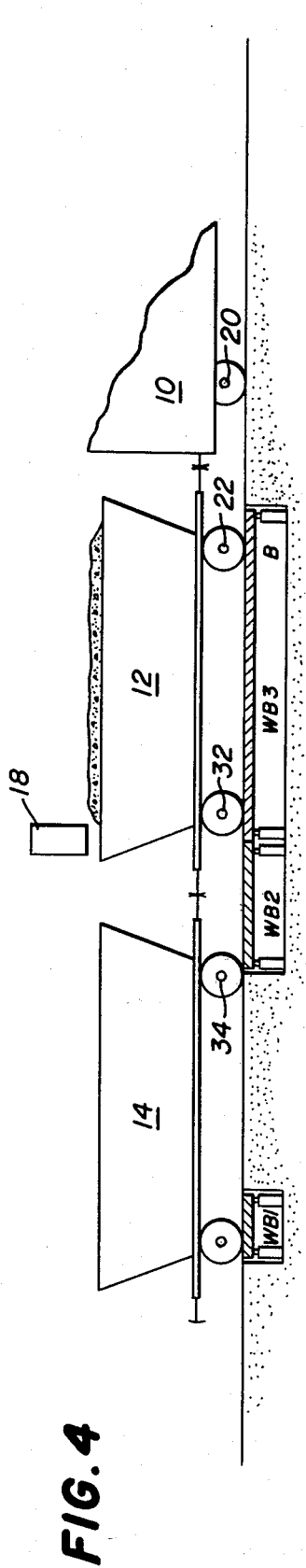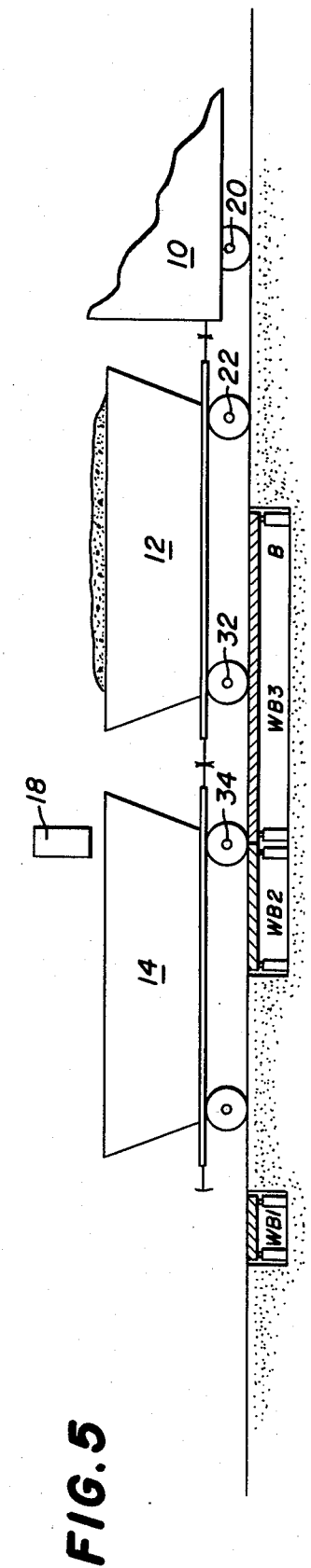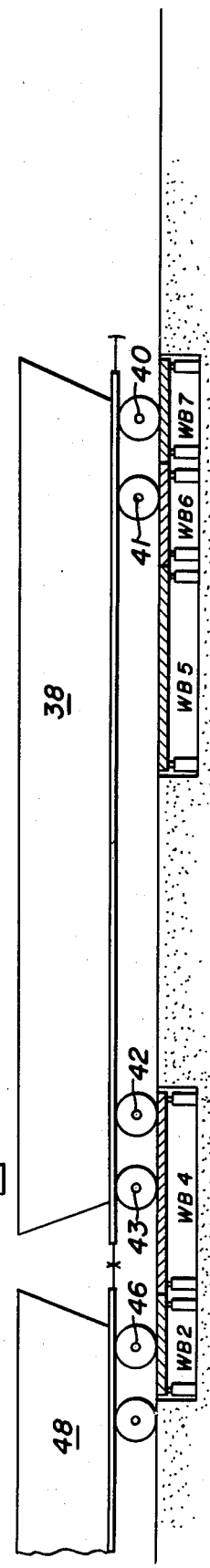

SYSTEM FOR WEIGHING RAILROAD CARS IN MOTION DURING LOADING

This is a continuation of application Ser. No. 040,572 filed May 21, 1979, now abandoned.

BACKGROUND OF THE INVENTION

The present invention concerns a novel system for weighing and loading freight cars coupled in motion.

In many coal-producing countries, there is an increasing tendency to carry large loads of coal long distances by rail. To keep this operation as efficient as possible, it is desirable to transport as much coal per freight car as is possible commensurate with keeping the loads within safe limits to avoid derailment problems.

Freight costs are frequently based on the maximum load capacity of a given train. However, the shippers, for example, the coal mine owners, must be careful not to overload a freight car. Any costs involved due to delays in the train operations through overloaded freight cars are charged to the shipper. Such delays can be both very expensive and time consuming with the result that there is frequently a tendency for the shipper to underfill the freight cars to avoid the penalties associated with overloading.

It is, therefore, an object of the invention to provide a system for loading freight cars which will ensure that the freight cars are filled virtually to their maximum capacities, but will also avoid overloading.

Another object of the present invention is to provide a system that accurately weighs the railway cars while they are coupled in motion during loading. For maximum accuracy, full draft weighing of each railroad car is desirable, but has been found difficult to obtain with cars coupled in motion, because certain prior art full draft weighing systems have required a weigh platform that extends the entire length of the railroad car under consideration, but does not extend far enough to include a portion of an adjacent railroad car. Such a full draft weighing system is not available with respect to the weighing of cars coupled in motion wherein the cars have slightly variable lengths.

It is thus a further object of the present invention to provide a system for weighing freight cars coupled in motion during loading which can be modified to accurately weigh cars having slightly variable lengths.

Another object of the present invention is to obtain a full draft weight of the railroad car under consideration during loading thereof, with the loading being terminated automatically when the car has reached a predetermined weight.

Other objects and advantages of the present invention will become apparent as the description proceeds.

SUMMARY OF THE INVENTION

In accordance with the present invention, a system is provided for weighing freight cars coupled in motion during loading. The system comprises an upstream weigh bridge having a length that is less than the distance between the rear axle of one car to be loaded and the front axle of the succeeding car and a downstream weigh bridge that is mechanically separated from the upstream weigh bridge. A loading chute overlies one of the weigh bridges for dispensing material to the freight cars for loading of the coupled freight cars during movement thereof.

First means are provided for sensing the position of the freight car under consideration and for opening the chute to load the freight car under consideration. Means are provided for detecting the full draft weight of the freight car during loading taking the weight on the upstream weigh bridge into consideration while axles of the car being loaded are on the upstream weigh bridge. Means are provided for closing the chute when the weight reaches a predetermined amount. Means are provided for determining the weight of the loaded freight car after the freight car has left the upstream weigh bridge and taking only the weight on the downstream weigh bridge into consideration.

In the illustrative embodiment, means are provided for sensing the position of the freight car under consideration and for closing the chute to stop loading the freight car when the freight car reaches a predetermined location. Means are also provided for sensing a locomotive and for inhibiting operation of the loading chute during such locomotive sensing.

In the illustrative embodiment, the first sensing means is operable to open the chute only after the first axle of the freight car has reached the downstream weigh bridge.

In a modified form of the invention, the downstream weigh bridge comprises a plurality of mechanically separated weigh bridge sections. In this manner, the system is operable for full draft weighing of different size freight cars during loading.

A more detailed explanation of the invention is provided in the following description and claims, and is illustrated in the accompanying drawings.

BRIEF DESCRIPTION OF THE DRAWINGS

FIG. 4 is similar to the FIG. 3 diagram, but shows the train in a fourth position;

FIG. 5 is similar to the FIG. 4 diagram, but shows the train in a fifth position; and FIG. 6 is a diagram of a system for weighing freight cars coupled in motion during loading according to a modified form of the present invention.

DETAILED DESCRIPTION OF THE ILLUSTRATED EMBODIMENTS

The system illustrated herein may be used in conjunction with a "flood" loading bunker system. To this end, a combination of weigh bridges are provided beneath a "flood" loading chute with the output signal from the weigh bridges, in combination with vehicle axle detection equipment, being used to control the opening and closing of the chute and to obtain accurate final weights, while the train is in motion.

Figure 1:
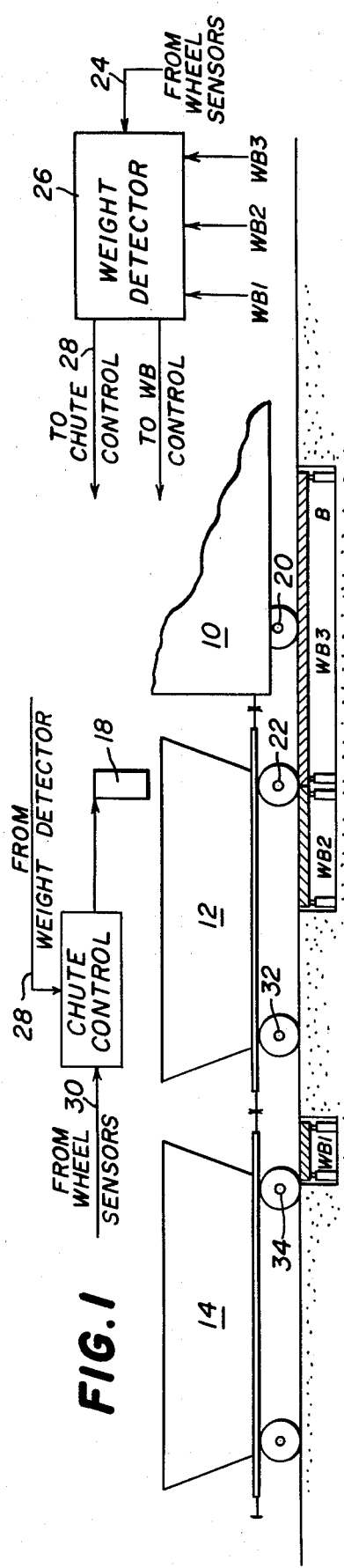
FIG. 1 is a diagram of a system for weighing freight cars coupled in motion during loading, in accordance with the principles of the present invention, with the train being diagrammatically illustrated in a first position.

Referring now to the Figures, in FIG. 1 a train is diagrammatically illustrated comprising a locomotive 10, a first freight car 12 in the form of a coal car, and a second freight car 14 also in the form of a coal car.

A first weigh bridge WB1 is provided for obtaining the tare of empty weigh of the freight cars as the train moves from left to right, in other words, prior to loading. Two separately operated weigh bridges are utilized to obtain weight information for controlling the loading chute 18 and for obtaining accurate gross weights. These two weigh bridges are upstream weigh bridge WB2 and downstream weigh bridge WB3 which is mechanically separated from upstream weigh bridge WB2. Upstream weigh bridge WB2 and downstream weigh bridge WB3 are located adjacent each other so that both of the weigh bridges WB2 and WB3 can preferably be used to detect the weight of the freight car under consideration during loading thereof. The upstream weigh bridge WB2 serves to provide an extra weigh bridge length for permitting an extra amount of roll during weighing of the freight car under consideration, but the weight on the upstream weigh bridge WB2 is not taken into consideration *after* the freight car is fully loaded and the weight of the loaded freight car is being determined.

The operation of the system can be most easily understood by referring to the figures with the train being shown in different positions in succeeding figures. Thus in FIG. 1, the last axle 20 of locomotive 10 is on weigh bridge WB3 and the first axle 22 of freight car 12 is passing between upstream weigh bridge WB2 and downstream weigh bridge WB3. While the sensing of the axle transitions from the upstream weigh bridge WB2 to the downstream weigh bridge WB3 may be utilized to sense the positions of the cars of the train, the use of strategically placed track switches, as disclosed in Rogers U.S. Pat. No. 3,374,844, may also be used to determine the type of car, number of axles, and position of the axles.

Thus if the track circuitry on the weigh bridges WB2 and WB3 detects that a locomotive is passing over the weigh bridges, inhibit signals are provided via line 24 to weigh detector 26 which will inhibit detection of weight of the locomotive and will provide chute control signals via line 28 to inhibit opening of the chute. If desired, the wheel sensors may be connected directly via line 30 to the chute control for providing direct chute control inhibit signals to prevent the chute from opening while the locomotive is on the weigh bridges.

Once first axle 22 of freight car 12 moves onto weigh bridge WB3, the front end of freight car 12 will be beneath the loading chute 18 and a signal from the wheel sensors will be provided via line 30 to the chute control to open the chute. As the train moves, the freight car 12 is flood-loaded and no action is taken by the weighing equipment until the last axle 20 of the locomotive 10 passes off weigh bridge WB3. Once the last axle 20 has passed off the weigh bridge, the combined output of weigh bridges WB2 and WB3 are used to detect a fully loaded condition of freight car 12, with allowance being made for coal in transit from the chute. Once this fully loaded condition is detected, the weight detector 26 which receives weight signals from the weigh bridges will provide a signal via line 28 to close the chute.

If for some reason the fully loaded condition has not occurred prior to the last axle 32 of freight car 12 moving onto downstream weigh bridge WB3, the transition of the last axle 32 from upstream weigh bridge WB2 to downstream weigh bridge WB3 will provide a signal to close the chute automatically, to avoid spillage between freight cars. Further, once axles 22 and 32 are scaleborne on downstream weigh bridge WB3, weigh detector 26 senses only the weight on downstream weight bridge WB3 so as to provide the full draft weight of the loaded freight car.

Figure 2:
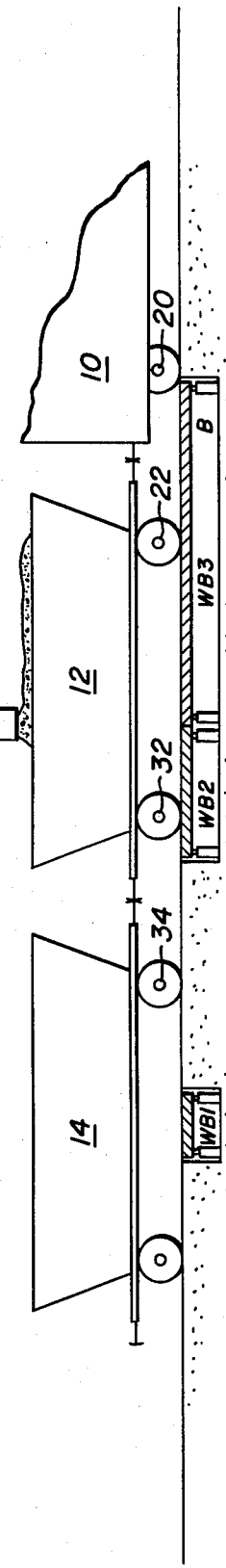
FIG. 2 is similar to the FIG. 1 diagram, but shows the train in a second position.

In FIG. 1, the train is shown in a position wherein the first axle 22 of freight car 12 is moving from upstream weigh bridge WB2 to downstream weigh bridge WB3, thereby providing a signal for chute 18 to open. In FIG. 2, the last axle 20 of the locomotive 10 is moving off downstream weigh bridge WB3. Axles 22 and 32 of freight car 12 are on downstream weigh bridge WB3 and upstream weigh bridge WB2, respectively, and weight detector 26 is operating to detect the full draft weight of freight car 12 during its loading. If freight car 12 becomes fully loaded to a predetermined weight, chute 18 will be automatically closed.

Figure 3:
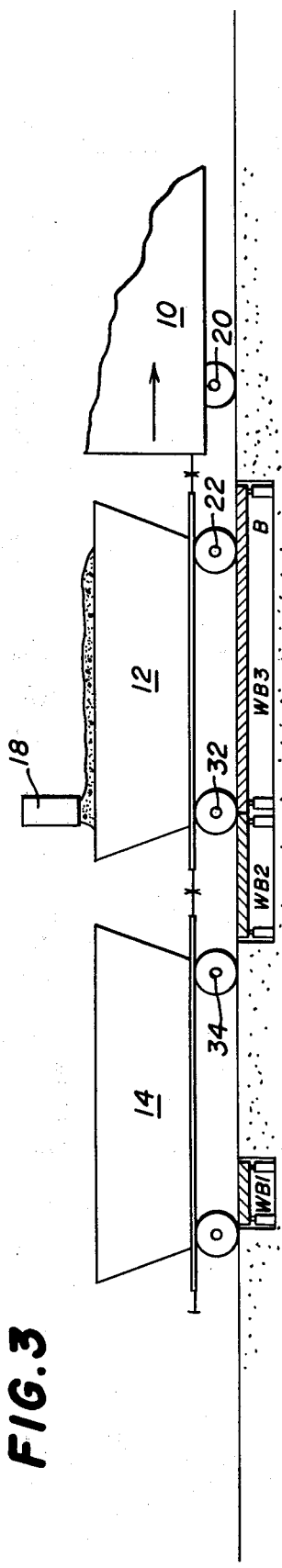
FIG. 3 is similar to the FIG. 2 diagram, but shows the train in a third position.

In FIG. 3, the last axle 32 of freight car 12 is passing from upstream weigh bridge WB2 to downstream weigh bridge WB3. If chute 18 has not previously been closed as a result of a fully loaded freight car, the chute 18 will automatically be closed as a result of the transition of last axle 32 from weigh bridge WB2 to weigh bridge WB3.

In FIG. 4, both axles 22 and 32 of freight car 12 are on downstream weigh bridge WB3 and the freight car is fully loaded. A weight determination is made, using only the weight on downstream weigh bridge WB3 and excluding any weight on upstream weigh bridge WB2. The weight determination on downstream weigh bridge WB3 could be full draft or multi-draft. In this manner, if the first axle 34 of freight car 14 were on upstream weigh bridge WB2 while both axles of freight car 12 were on downstream weigh bridge WB3, the weight of axle 34 would not be taken into consideration during the weighing of freight car 12. On the other hand, by using upstream weigh bridge WB2 during loading of freight car 12, the weight of the freight car during loading can be determined with sufficient additional roll provided by the upstream weigh bridge WB2 to enable proper detection of the weight during loading.

In FIG. 5, the first axle 34 of freight car 14 is moving from upstream weigh bridge WB2 to downstream weigh bridge WB3 and thus a signal will be provided to open the chute to begin loading freight car 14. Freight car 14 will be loaded and weighed as previously described with respect to freight car 12.

In summary, a split weigh bridge or an upstream weigh bridge and a downstream weigh bridge is provided. The freight car can be full draft weighed during loading and the problem of having a foreign axle on the upstream weigh bridge is obviated. To accomplish this result, the upstream weigh bridge has a length that is less than the distance between the rear axle of a car to be loaded and the front axle of the succeeding car. Thus, once the front axle of the succeeding car (foreign axle) is on the upstream weigh bridge, the rear axle of the car being loaded has left the upstream weigh bridge and the weight on the upstream weigh bridge is not taken into consideration.

However, the upstream weigh bridge provides an extra roll length and the loading can operate during the time that the axles are on both the upstream weigh bridge and the downstream weigh bridge whereby once the car is moved onto the downstream weigh bridge, the upstream weigh bridge is electrically and mechanically disconnected.

As an example of how the upstream weigh bridge could be electrically and mechanically disconnected, the system could be operated so that during loading, the weights on weigh bridge WB2 and weigh bridge WB3 are both being fed to weight detector 26. However, once the car that is loaded is moved onto the downstream weigh bridge WB3, weigh bridge WB2 could be electrically disconnected by merely opening a switch so that only the weight on weigh bridge WB3 is being fed to weight detector 26.

In the modified form of the invention illustrated in FIG. 6, the downstream weigh bridge comprises a plurality of mechanically separated weigh bridge sections WB4, WB5, WB6 and WB7. Thus upstream weigh bridge WB2 provides extra roll for the freight car being loaded. Upstream weigh bridge WB2 is mechanically and electrically disconnected once the car being loaded is moved onto the downstream weigh bridge.

By providing a downstream weigh bridge having separated sections, freight cars having various lengths can be weighed with various sections being electrically and mechanically disconnected during weighing so that the axles of a foreign freight car will not be taken into consideration. Thus referring to FIG. 6, freight car 38 includes first axle 40, second axle 41, third axle 42 and fourth axle 43. When second axle 41 enters downstream weigh bridge segment WB4 from upstream weigh bridge WB2, chute 18 is automatically opened to begin the loading operation. During loading, the weight of freight train 38's axles on both the upstream and downstream weigh bridges are taken into consideration while axles of the car being loaded are in the upstream weigh bridge. Once the weight has reached a predetermined amount, loading chute 18 is closed. A final weight of the loaded freight car 38 may then be taken. The final weight is not affected by first axle 46 of freight car 48 being on the upstream weigh bridge WB2.

By using various lengths and combination of weigh bridges together with track circuitry to detect different types of freight cars, the loading of different types of freight cars may be monitored and detected using the principles of this invention. Reference is made to Jones and Hochberger U.S. Pat. No. 4,094,367 for a description of a system for full draft weighing of freight cars coupled in motion during loading, for an example of the locations of wheel sensors, for information relating to the adding of a preload compensation amount on the scales to compensate for the weight of material that will continue through the chute until the chute is closed and for other pertinent circuitry.

As a specific example, although no limitation is intended, the weigh bridges illustrated in FIG. 6 may have the following dimensions. Upstream weigh bridge WB2 may be 6 feet in length, downstream weigh bridge segment WB4 may be 12 feet in length, downstream weigh bridge segment WB5 may be separated from weigh bridge segment WB4 by 17 feet and be 12 feet in length, weigh bridge segment WB6 may be 6 feet in length and weigh bridge segment WB7 may be 6 feet in length.

Although illustrative embodiments of the invention have been shown and described, it is to be understood that various modifications and substitutions may be made without departing from the novel spirit and scope of the present invention.

What is claimed is:

1. A method for weighing freight cars coupled in motion, which comprises the steps of:
providing an upstream weigh bridge having a length that is less than the distance between the rear axle of one car to be loaded and the front axle of the succeeding car;
providing a downstream weigh bridge mechanically separated from said upstream weigh bridge;
detecting the full draft weight of the freight car during loading taking the weight on said upstream weigh bridge into consideration while an axle of the car is on said upstream weigh bridge; and
determining the weight of the loaded freight car after the freight car has left the upstream weigh bridge and taking only the weight of the downstream weigh bridge into consideration, said determining means including means for electrically disconnecting said upstream weigh bridge from said downstream weigh bridge after the freight car has left the upstream weigh bridge.

2. A method as described in claim 1, including the step of detecting the full draft weight of the freight car during loading by taking into consideration the combined weights on said upstream and downstream weigh bridges.

3. A method for weighing freight cars coupled in motion during loading, which comprises the steps of:
providing an upstream weigh bridge having a length that is less than the distance between the rear axle of one car to be loaded and the front axle of the succeeding car;
providing a downstream weigh bridge mechanically separated from said upstream weigh bridge;
providing a chute overlying one of said weigh bridges for dispensing material to the freight cars for loading of the coupled freight cars during movement thereof;
sensing the position of the freight car under consideration and opening the chute to load said freight car under consideration;
detecting the full draft weight of the freight car during loading taking the weight on said upstream weigh bridge into consideration while an axle of the car being loaded is on said upstream weigh bridge;
determining the weight of the loaded freight car after the freight car has left the upstream weigh bridge and taking only the weight of the downstream weigh bridge into consideration; said determining means including means for electrically disconnecting said upstream weigh bridge from said downstream weigh bridge after the freight car has left the upstream weigh bridge; and
closing the chute when the weight reaches a predetermined amount.

4. A method as described in claim 3, including the step of sensing the position of the freight car under consideration and closing the chute to stop loading the freight car when it reaches a predetermined location.

5. A method as described in claim 3, including the step of detecting the full draft weight of the freight car during loading by taking into consideration the combined weights on said upstream and downstream weigh bridges.

6. A system for weighing freight cars coupled in motion, which comprises:
an upstream weigh bridge;
a downstream weigh bridge mechanically separated from said upstream weigh bridge;
means for detecting the full draft weight of the freight car taking the weight on said upstream weigh bridge into consideration while an axle of the car being weighed is on said upstream weigh bridge; and means for determining the weight of the freight car after the freight car has left the upstream weigh bridge and taking only the weight on the downstream weigh bridge into consideration, said determining means including means for electrically disconnecting said upstream weigh bridge from said downstream weigh bridge after the freight car has left the upstream weigh bridge.

7. A system as defined by claim 6, wherein said upstream weigh bridge has a length that is less than the distance between the rear axle of a freight car and the front axle of the succeeding car.

8. A system as defined by claim 6, including a loading chute overlying one of said weigh bridges for dispensing material to the freight cars for loading of the coupled freight cars during movement thereof;
first means for sensing the position of the freight car under consideration and for opening the chute to load said freight car under consideration; and
means for closing the chute when the weight reaches a predetermined amount.

9. A system as defined by claim 6, said downstream weigh bridge comprising a plurality of mechanically separated weigh bridge sections, operable for full draft weighing during weighing of different size freight cars.

10. A system for weighing freight cars coupled in motion during loading, which comprises:
an upstream weigh bridge having a length that is less than the distance between the rear axle of one car to be loaded and the front axle of the succeeding car;
a downstream weigh bridge mechanically separated from said upstream weigh bridge;
a loading chute overlying one of said weigh bridges for dispensing material to the freight cars for loading of the coupled freight cars during movement thereof;
first means for sensing the position of the freight car under consideration and for opening the chute to load said freight car under consideration;
means for detecting the full draft weight of the freight car during loading taking the weight on said upstream weigh bridge into consideration while axles of the car being loaded are on said upstream weigh bridge;
means for determining the weight of the loaded freight car after the freight car has left the upstream weigh bridge and taking only the weight on the downstream weigh bridge into consideration, said determining means including means for electrically disconnecting said upstream weigh bridge from said downstream weigh bridge after the freight car has left the upstream weigh bridge; and
said downstream weigh bridge comprising a plurality of mechanically separated weigh bridge sections, operable for full draft weighing during loading of different size freight cars.

11. A system for weighing freight cars coupled in motion during loading, which comprises:
an upstream weigh bridge having a length that is less than the distance between the rear axle of one car to be loaded and the front axle of the succeeding car;
a downstream weigh bridge mechanically separated from said upstream weigh bridge;
a loading chute overlying one of said weigh bridges for dispensing material to the freight cars for loading of the coupled freight cars during movement thereof;
first means for sensing the position of the freight car under consideration and for opening the chute to load said freight car under consideration;
means for detecting the full draft weight of the freight car during loading taking the weight on said upstream weigh bridge into consideration while an axle of the car being loaded is on said upstream weigh bridge;
means for determining the weight of the loaded freight car after the freight car has left the upstream weigh bridge and taking only the weight on the downstream weigh bridge into consideration; said determining means including means for electrically disconnecting said upstream weigh bridge from said downstream weigh bridge after the freight car has left the upstream weigh bridge; and
means for closing the chute when the weight reaches a predetermined amount.

12. A system as described in claim 11, including second means for sensing the position of the freight car under consideration and for closing the chute to stop loading the freight car when the freight car reaches a predetermined location.

13. A system as described in claim 11, said detecting means being operable to detect the full draft weight of the freight car during loading by taking into consideration the combined weights on said upstream and downstream weigh bridges.

14. A system as described in claim 11, said first sensing means being operable to open the chute only after the first axle of the freight car has reached the downstream weigh bridge.

15. A system as described in claim 11, said first sensing means comprising means for sensing the transition from the upstream weigh bridge to the downstream weigh bridge.

16. A system as described in claim 11, said first sensing means comprising a track switch.

17. A system as described in claim 11, said downstream weigh bridge comprising a plurality of mechanically separated weigh bridge sections, operable for full draft weighing during loading of different size freight cars.

* * * * *